(12) United States Patent
Hughes

(10) Patent No.: US 10,421,407 B2
(45) Date of Patent: Sep. 24, 2019

(54) TRUNK MOUNTED STORAGE RACK FOR SPORT UTILITY VEHICLES

(71) Applicant: Gary W. Hughes, La Porte, IN (US)

(72) Inventor: Gary W. Hughes, La Porte, IN (US)

( * ) Notice: Subject to any disclaimer, the term of this patent is extended or adjusted under 35 U.S.C. 154(b) by 0 days.

(21) Appl. No.: 16/108,807

(22) Filed: Aug. 22, 2018

(65) Prior Publication Data

US 2018/0361939 A1    Dec. 20, 2018

Related U.S. Application Data

(63) Continuation-in-part of application No. 15/894,922, filed on Feb. 12, 2018, now Pat. No. 10,093,241.

(60) Provisional application No. 62/457,950, filed on Feb. 12, 2017.

(51) Int. Cl.
| | | |
|---|---|---|
| *B60R 7/02* | (2006.01) | |
| *B60R 7/08* | (2006.01) | |
| *B60R 5/04* | (2006.01) | |
| *A47B 47/00* | (2006.01) | |
| *B60R 7/00* | (2006.01) | |
| *B60R 11/00* | (2006.01) | |

(52) U.S. Cl.
CPC ............... *B60R 7/02* (2013.01); *B60R 5/045* (2013.01); *B60R 7/08* (2013.01); *A47B 47/0083* (2013.01); *A47B 47/0091* (2013.01); *B60R 5/044* (2013.01); *B60R 2011/0036* (2013.01)

(58) Field of Classification Search
CPC .. B60R 7/00; B60R 7/02; B60R 7/005; B60R 7/04; B60R 7/08; B60R 2011/0003; B60R 2011/0036; B60R 5/00; B60R 5/003; B60R 5/04; B60R 5/044; B60R 5/047; A47B 43/00; A47B 43/0083; A47B 43/0091; A47B 7/045; A47B 7/047; A47B 81/00; Y10S 224/925
USPC ..... 224/539, 542, 925; 296/37.16; D12/424, D12/425; 211/134–153; 108/44
See application file for complete search history.

(56) References Cited

U.S. PATENT DOCUMENTS

| | | | | |
|---|---|---|---|---|
| 3,964,810 | A * | 6/1976 | Murphy | A47B 47/04 312/265.2 |
| 4,940,150 | A * | 7/1990 | Spengler | A47B 87/0223 211/133.1 |
| D312,604 | S * | 12/1990 | Barnes | D12/424 |
| 5,031,769 | A * | 7/1991 | Shea | B25H 3/022 206/335 |
| 5,238,128 | A * | 8/1993 | Stoddard | A47F 5/005 211/133.1 |
| 5,573,125 | A * | 11/1996 | Denny | A47B 96/00 160/84.01 |
| 5,601,198 | A * | 2/1997 | Reed | A47B 96/02 211/180 |

(Continued)

*Primary Examiner* — Justin M Larson

(57) ABSTRACT

A trunk mounted storage rack for sport utility vehicles (SUV) securely restrains grocery bags and prevents damage to fragile items contained therein. The trunk mounted storage rack includes a top shelf, a bottom shelf, a top lip, a bottom lip, a top-level barrier, an intermediate support frame, and a barrier support wall. The top shelf and the bottom shelf are sized to closely fit in the trunk of the SUV. The intermediate support frame suspends the top shelf over the bottom shelf. The barrier support wall allows the top-level barrier to mount to the top shelf and prevent items from falling from the top shelf into the rear seat compartment when the SUV turns or brakes.

15 Claims, 13 Drawing Sheets

(56) References Cited

U.S. PATENT DOCUMENTS

| | | | | |
|---|---|---|---|---|
| 5,685,470 A * | 11/1997 | Moore | B60R 7/005 | 224/567 |
| D392,938 S * | 3/1998 | Sylvester | D12/426 | |
| 5,791,501 A * | 8/1998 | Baldwin, Jr. | A47B 97/00 | 108/27 |
| 5,984,121 A * | 11/1999 | Cole | B65G 1/02 | 211/183 |
| D426,512 S * | 6/2000 | Ciuba | D12/425 | |
| 6,155,621 A * | 12/2000 | Nishida | B60R 21/06 | 280/749 |
| 6,178,896 B1 * | 1/2001 | Houk, Jr. | A47B 87/0223 | 108/157.13 |
| D439,769 S * | 4/2001 | Prince | D6/677.1 | |
| 6,345,944 B1 * | 2/2002 | Florence | B60P 7/0876 | 410/118 |
| 6,386,412 B1 * | 5/2002 | Konechne | B60R 7/04 | 224/275 |
| 6,609,621 B2 * | 8/2003 | Denny | A47B 47/021 | 211/180 |
| 6,619,490 B2 * | 9/2003 | Calleja | A47F 5/01 | 211/180 |
| 6,629,726 B2 * | 10/2003 | Johnston | B60N 3/004 | 297/188.06 |
| 6,641,192 B2 * | 11/2003 | Eschenfelder | A47B 87/02 | 296/37.1 |
| 6,698,604 B2 * | 3/2004 | Denny | A47B 47/021 | 182/138 |
| 6,722,512 B2 * | 4/2004 | Scully | A47F 5/13 | 211/175 |
| D493,047 S * | 7/2004 | Moon | D6/675.1 | |
| D497,497 S * | 10/2004 | Harwanko | D6/678.1 | |
| 6,877,828 B2 * | 4/2005 | Strong | A47B 81/002 | 280/47.35 |
| D509,178 S * | 9/2005 | Panasewicz | D12/425 | |
| 6,942,269 B2 * | 9/2005 | Mains | B60N 3/001 | 108/44 |
| 7,014,053 B2 * | 3/2006 | Calleja | A47F 5/01 | 182/138 |
| 7,191,907 B2 * | 3/2007 | Conway | A47B 47/027 | 182/138 |
| D549,154 S * | 8/2007 | Panasewicz | D12/424 | |
| D553,555 S * | 10/2007 | Panasewicz | D12/425 | |
| 7,401,716 B2 * | 7/2008 | Svenson | B60R 5/045 | 224/42.32 |
| 7,784,885 B2 * | 8/2010 | Steiger | B60P 3/14 | 108/106 |
| 8,317,039 B2 * | 11/2012 | Norman | A47B 87/0261 | 211/60.1 |
| 8,408,638 B2 * | 4/2013 | Pencak | B62D 25/2054 | 296/191 |
| 8,651,351 B2 * | 2/2014 | Fowler | B60R 5/04 | 224/281 |
| 8,763,871 B2 * | 7/2014 | Lucas | B60R 5/04 | 224/542 |
| 8,876,184 B2 * | 11/2014 | Lucas | B60R 7/043 | 296/24.44 |
| 9,138,079 B2 * | 9/2015 | Su | A47F 5/11 | |
| 9,211,010 B1 * | 12/2015 | Nagy | A47B 96/00 | |
| 9,332,865 B1 * | 5/2016 | Mason | A47F 5/10 | |
| 9,345,342 B1 * | 5/2016 | Nagy | A47B 96/00 | |
| 9,538,846 B2 * | 1/2017 | Reinhart | A47B 96/02 | |
| 9,834,149 B2 * | 12/2017 | Hanley | B60R 7/08 | |
| 10,118,561 B2 * | 11/2018 | James-Moore | A47B 47/00 | |
| 10,336,261 B2 * | 7/2019 | White | B60R 5/048 | |
| 2002/0148799 A1 * | 10/2002 | Denny | A47B 47/021 | 211/186 |
| 2004/0129660 A1 * | 7/2004 | Kita | A47B 81/06 | 211/180 |
| 2004/0211740 A1 * | 10/2004 | Denny | A47F 13/00 | 211/183 |
| 2005/0000928 A1 * | 1/2005 | Calleja | B65G 1/00 | 211/183 |
| 2005/0056605 A1 * | 3/2005 | Calleja | A47F 5/01 | 211/183 |
| 2005/0103736 A1 * | 5/2005 | Calleja | A47B 47/021 | 211/189 |
| 2005/0263470 A1 * | 12/2005 | Horneland | A47B 47/021 | 211/183 |
| 2007/0187349 A1 * | 8/2007 | Calleja | A47B 47/021 | 211/189 |
| 2009/0107942 A1 * | 4/2009 | Liao | A47B 47/045 | 211/183 |
| 2015/0351543 A1 * | 12/2015 | Nagy | A47B 96/00 | 211/134 |
| 2016/0120338 A1 * | 5/2016 | Nagy | A47B 96/00 | 211/153 |

* cited by examiner

TRUNK MOUNTED STORAGE RACK FOR SPORT UTILITY VEHICLES

The current application claims a priority to the U.S. Provisional Patent application Ser. No. 62/457,950 filed on Feb. 12, 2017.

FIELD OF THE INVENTION

The present invention generally relates to trunk mounted storage rack for sport utility vehicles. More specifically, the trunk mounted storage rack can be configured into either a twin-shelf configuration or a triple-shelf configuration to make the most effective use of space.

BACKGROUND OF THE INVENTION

The present invention is designed and manufactured to custom fit the space between the rear seats and the rear door above the back bumper of sport utility vehicle (SUV). The present invention addresses the problem of haphazard stacking of grocery bags on top of each other, causing fragile items to be crushed under heavy items. This also ruptures the grocery bags and flings groceries out of the rear door when the rear door is opened.

Accordingly, the present invention utilizes shelves to separate heavier grocery bags from lighter grocery bags containing fragile items. The present invention can be configured into either a twin-shelf configuration or a triple-shelf configuration. The twin-shelf configuration utilizes 20" long columns, whereas the triple-shelf configuration utilizes a center shelf with 10" long columns. This gives people with midsize SUVs the option to use either configuration—both being approximately the same height. Additionally, the twin-shelf configuration may be more suited to hold taller grocery bags owing to the increased height. The tripe-shelf configuration may be suited to hold many shorter grocery bags owing to the extra capacity provided by the center shelf and the decreased height.

The shelves are sized to fit wall-to-wall in the trunk of the SUV, thereby preventing the grocery bags from jostling around the trunk. As such, the width of the shelves is equal to that of the trunk. Similarly, the shelves are also sized to be positioned coincident to the rear seat. In most SUVs, the rear seats are usually slanted towards the rear. This causes the trunk space to taper in the vertical direction. Accordingly, in both the twin-shelf configuration and the triple-shelf configuration, the shelves are successively narrower in the vertical direction. This allows the present invention to fully utilize the available trunk space.

The present invention may come in different sizes and shapes to fit different brands of SUVs. Since there are so many models and brands of SUVs, all models of SUVs which have similar shaped spaces behind the rear seat would be served by a single type of shelf. All pertaining SUV models would be mentioned on the shelf packaging. As an added option, a platform allows a slide-out removable cooler for refrigerated items to be mounted on the bottom-most shelf. The platform raises the cooler above the upward-facing edge, thereby allowing the cooler to be easily slid off and on the shelf.

DETAILED DESCRIPTION OF THE INVENTION

All illustrations of the drawings are for the purpose of describing selected versions of the present invention and are not intended to limit the scope of the present invention.

The present invention is a truck mounted storage rack for a sport utilize vehicle (SUV). The present invention securely palletizes grocery bags and prevents bags with heavy items from crushing bags that contain fragile items.

Figure 1:
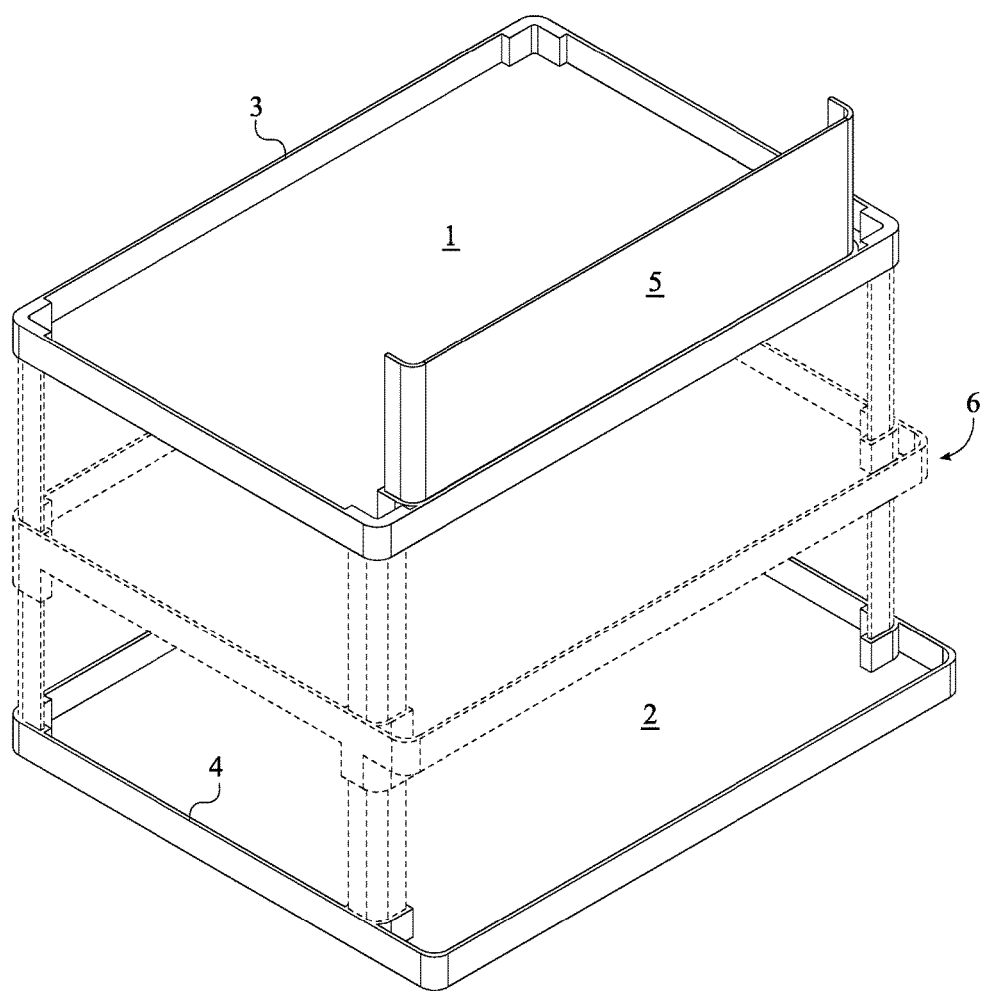
FIG. 1 is top front perspective view of the present invention.
Figure 2:
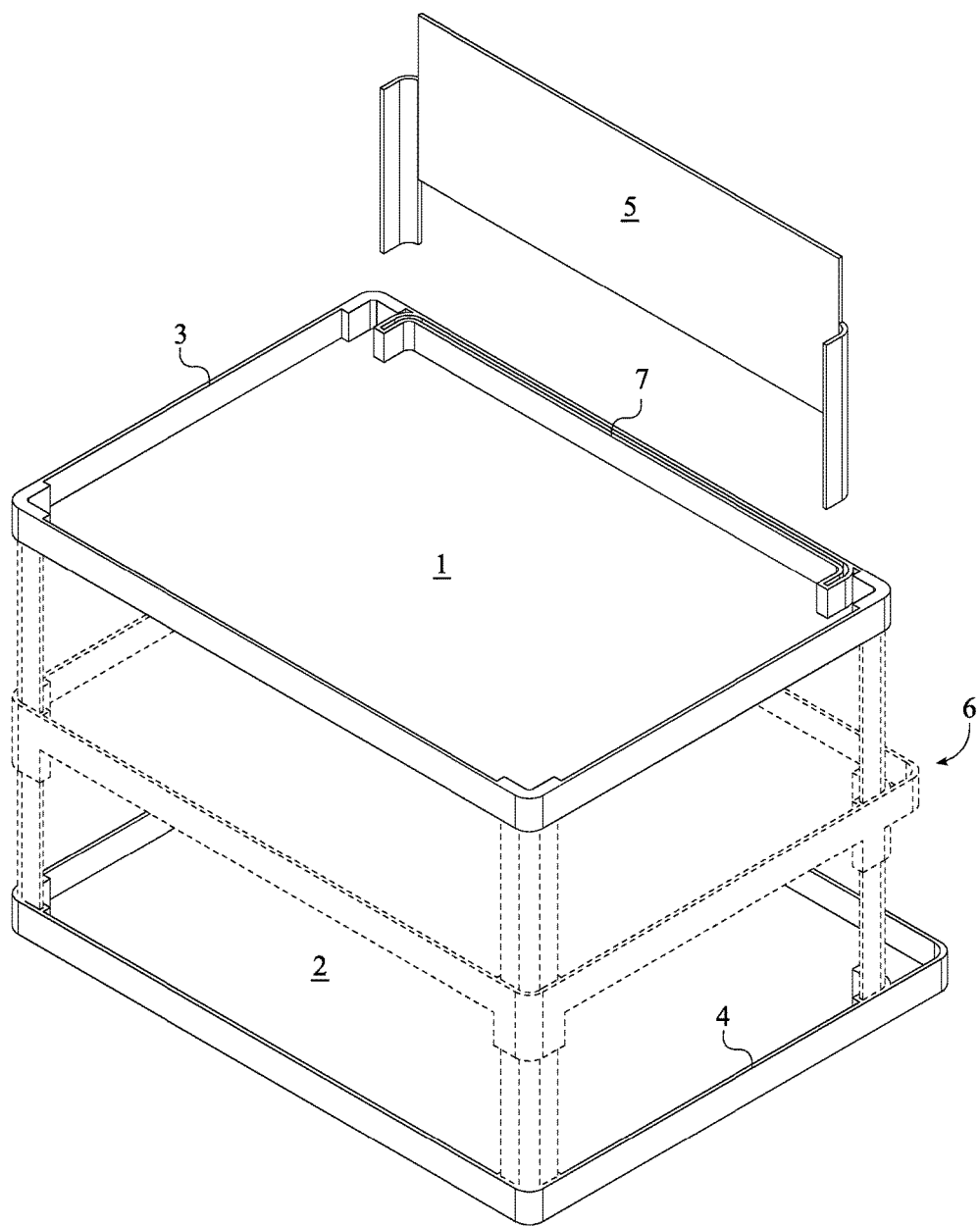
FIG. 2 is top rear perspective view of the present invention illustrating the barrier support wall.

Referring to FIG. 1 and FIG. 2, the preferred embodiment of the present invention comprises a top shelf 1, a bottom shelf 2, a top lip 3, a bottom lip 4, a top-level barrier 5, an intermediate support frame 6 and a barrier support wall 7. The present invention may be configured into either a twin-shelf configuration or a triple-shelf configuration. In the twin-shelf configuration, the intermediate support frame 6 is just a structural frame used to support the top shelf over the bottom shelf. In a triple-shelf configuration, the intermediate support frame 6 may include one or more shelves for holding grocery bags. The twin-shelf configuration sacrifices floor space for more vertical space and is thus suited to carry tall grocery bags. In contrast, the triple-shelf configuration uses additional shelves to increase floor space at the cost of vertical space. As such, the triple-shelf configuration may be suited to carry a large number of short grocery bags. Preferably, both the top shelf 1 and the bottom shelf 2 are sized to fit between the back seats and the rear door of the SUV. The top shelf 1 and the bottom shelf 2 are constructed out of large flat sheets of metal or plastic that remain rigid under load. To further increase rigidity, the top shelf 1 and the bottom shelf 2 are ribbed. Preferably, both the top shelf 1 and the bottom shelf 2 are 0.125" thick, and 37" long. To fit into the tapered trunk space created by the reclined rear seats, the top shelf 1 is narrower than the bottom shelf 2. More specifically, the top shelf 1 is 26" wide, whereas the bottom shelf 2 is 30" wide.

In the preferred embodiment, the top shelf 1 is terminally attached to the intermediate support frame 6. Likewise, the bottom shelf 2 is terminally attached to the intermediate support frame 6, opposite the top shelf 1. Accordingly, the intermediate support frame 6 suspends the top shelf 1 over the bottom shelf 2, thereby creating room for grocery bags on the bottom shelf 2. In the preferred implementation, the top shelf 1 and the bottom shelf 2 separate the heavy grocery bags from the light grocery bags containing fragile items. Preferably, the heavier grocery bags are placed on the bottom shelf 2. More specifically, the heavier grocery bags are enclosed by the intermediate support frame 6 on the bottom shelf 2, as heavier items are more susceptible to fall when the SUV turns or accelerates. In contrast, lighter grocery bags containing fragile items are placed on the top shelf 1, as lighter items have low inertia and are less likely to be affected by the SUV's motion. The top shelf 1 is also constructed with a top lip 3 for containing liquids during spills. The top lip 3 is perimetrically connected around the top shelf 1.

In case the lighter grocery bags become dislodged under heavy braking, the top-level barrier 5 prevents grocery bags from falling onto the rear seats. The barrier support wall 7 securely attaches the top-level barrier 5 to the top shelf 1. In the preferred embodiment, the barrier support wall 7 is connected onto the top shelf 1. The top lip 3 and the barrier support wall 7 are positioned offset from each other, thereby creating a slot for the top-level barrier. Accordingly, the top-level barrier 5 is mounted between the barrier support wall 7 and top lip 3. Preferably, the top-level barrier 5 is mounted deep between the barrier support wall 7 and the top lip 3 to prevent the top-level barrier 5 from easily slipping out. The portion of the top lip 3 coincident to the top-level barrier 5 may be thickened to better support the top-level barrier 5.

In the preferred embodiment, the top-level barrier 5 is 0.25" thick, 12" high, with 2" side panels extending from the edges. More specifically, the top-level barrier 5 is composed of two angles and a flat sheet of clear acrylic. The two angles insert into the L-shaped end pieces of the barrier support wall 7 that open upwards from the top shelf. The flat sheet of clear acrylic is positioned adjacent to the angles at each end and extends between two L-shaped end pieces, along the seat edge of the top lip 3. Accordingly, the top-level barrier 5 allows lighter more fragile items to be placed on the top shelf 1 and the heavier items placed on the bottom shelf 3 within the lower support frame 63. To position the top lip 3 and the barrier support wall 7 to face upwards, the top lip 3 and the barrier support wall 7 are oriented away from the intermediate support frame 6.

The bottom lip 4 helps retain spills within the confines of the bottom shelf 2. As such, the bottom lip 4 is perimetrically connected around the bottom shelf 2. The bottom lip 4 is also oriented towards the intermediate support frame 6, which points the bottom lip 4 upwards in relation to the SUV. Both the top lip 3 and the bottom lip 4 are 2" in height and 0.25" thick, with the portion of the top lip 3 adjacent to the barrier support wall, being thickened to 0.5".

Figure 3:
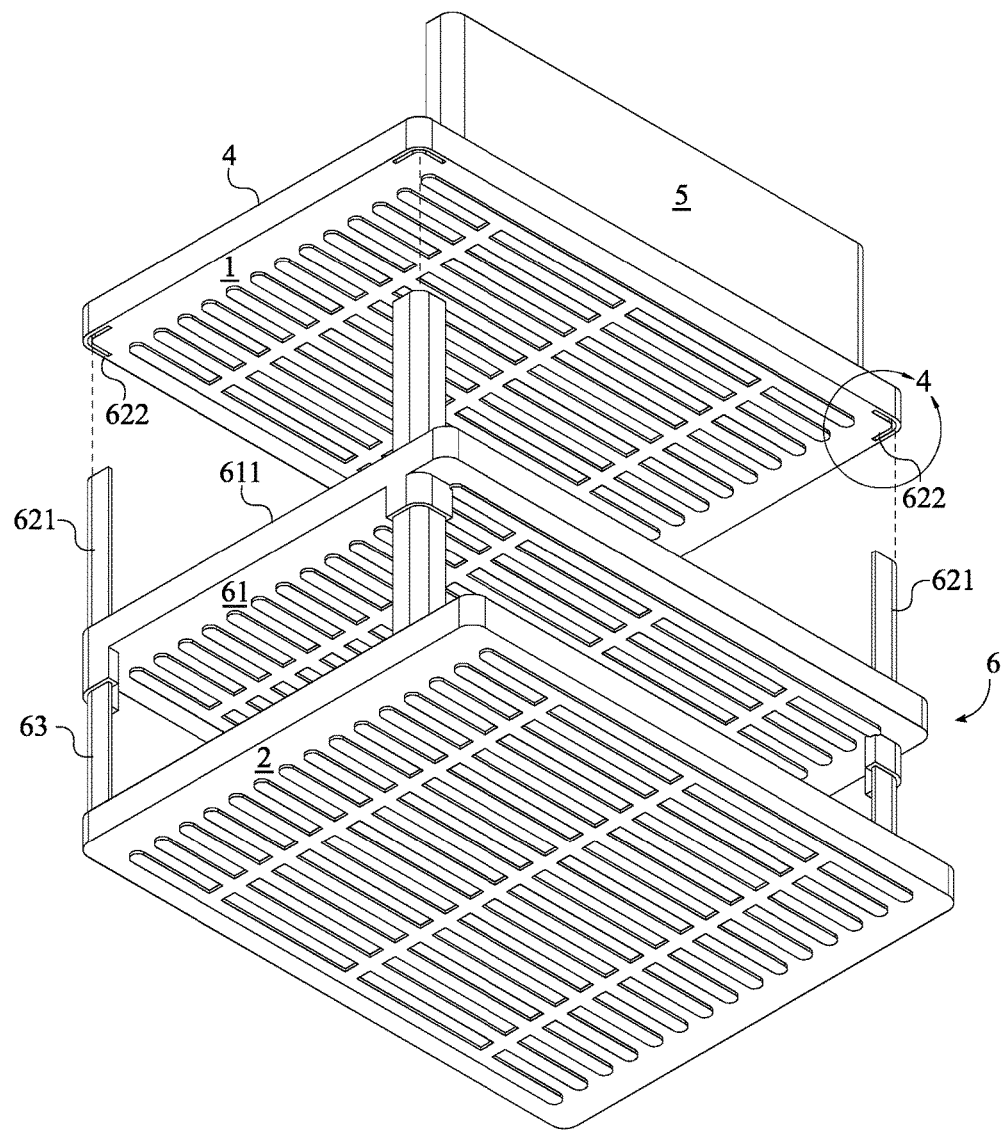
FIG. 3 is bottom front perspective view of the present invention illustrating the plurality of first receptacles.
Figure 7:
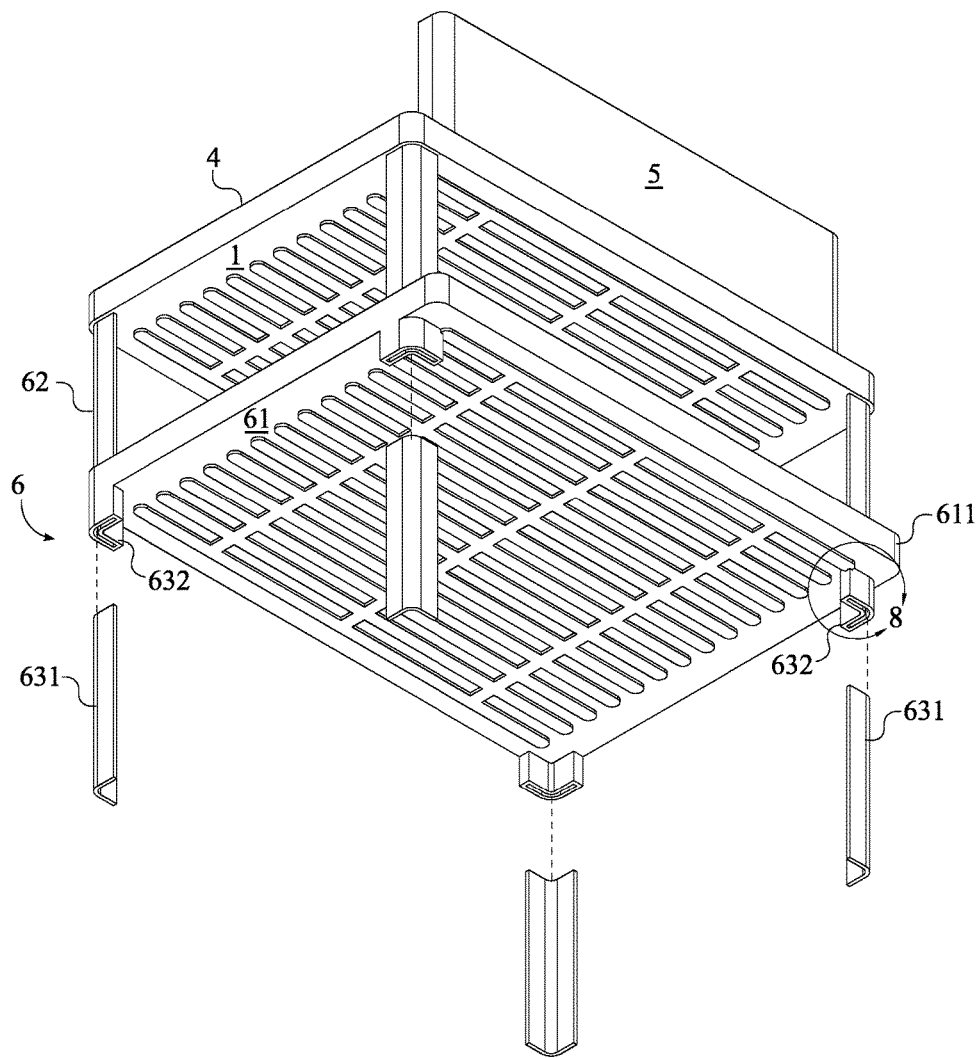
FIG. 7 is bottom front perspective view of the present invention illustrating the plurality of third receptacles.
Figure 8:
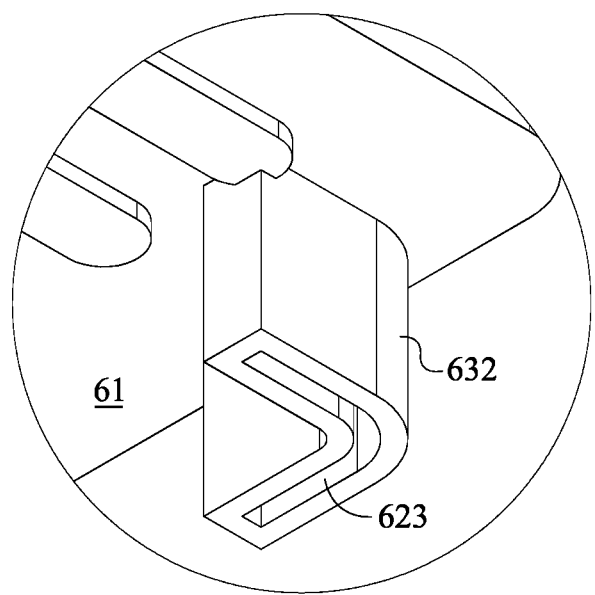
FIG. 8 is detail view of the second receptacles taken about circle 7 in FIG. 7.

Referring to FIG. 3 and FIG. 7, the present invention is designed to be versatile and allow flexibility of use. As such, the intermediate support frame 6 may include one or more shelves for holding additional grocery bags. In one possible embodiment of the present invention, the intermediate support frame 6 comprises a center shelf 61, a center support frame 62, and a lower support frame 63. The lower support frame 63 suspends the center shelf 61 and the top shelf 1 over the bottom shelf 2. As such, the bottom shelf 2 is terminally attached to the lower support frame 63. Likewise, the center shelf 61 is terminally attached to the lower support frame 63, opposite the bottom shelf 2. This offsets the center shelf 61 from the bottom shelf 2, creating a space enclosed by the lower support frame 63 that can be used to store grocery bags. Similarly, the center support frame 62 suspends the top shelf 1 over the center shelf 61 and the bottom shelf 2. As such, the center shelf 61 is terminally attached to the center support frame 62, opposite lower support frame 63. Preferably, the center support frame 62 and the lower support frame 63 attach at opposite ends of the center shelf 61. As such, the top shelf 1 is terminally attached to the center support frame 62, opposite the center shelf 61. Resultantly, the center support frame 62 offsets the top shelf 1 from the center shelf 61, thereby creating a level platform for holding grocery bags.

The center shelf 61 is also constructed with a center lip 611 for containing spills. As such, the center lip 611 is perimetrically connected around the center shelf 61. Further, the center lip 611 is oriented away from the bottom shelf 2. This creates a recessed area in the center shelf 61 capable of holding liquid spills therein.

Figure 4:
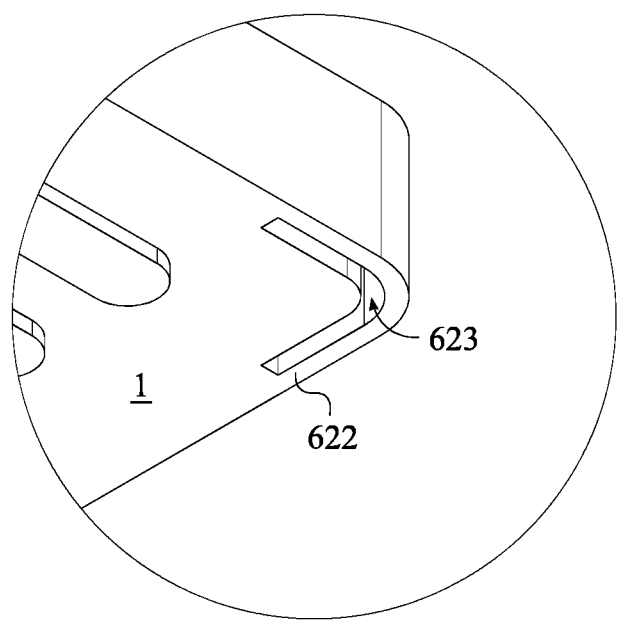
FIG. 4 is detail view of the first receptacles taken about circle 4 in FIG. 3.

Referring to FIG. 3 and FIG. 4, the center support frame 62 creates an enclosed structure which both protects and confines grocery bags inside the bottom shelf 2. The preferred embodiment of the center support frame 62 comprises a plurality of center columns 621, a plurality of first receptacles 622, and a plurality of second receptacles 624. Each of the plurality of center columns 621 is a solid L-shaped column made of rigid plastics. Preferably, the plurality of center columns 621 is 0.25" thick, 2" long, 2" wide, and 10" high. Similarly, the plurality of first receptacles 622 and the plurality of second receptacles 624 are L-shaped tubes extending normal out of the top shelf 1 and the top shelf 1 and the center shelf 61 respectively. Alternately, the plurality of first receptacles 622 and the plurality of second receptacles 624 may be any shape or size suited to receive the plurality of center columns 621. Preferably, the plurality of first receptacles 622 is peripherally mounted onto the top shelf 1. More specifically, at least two of the plurality of first receptacles 622 are positioned adjacent to the corners of the top shelf 1 to increase structural integrity and rigidity. An opening 623 of the plurality of first receptacles 622 is oriented towards the center shelf 61. This positions each of the plurality of first receptacles 622 downwards, capable of connecting onto the top of a corresponding center column.

Figure 5:
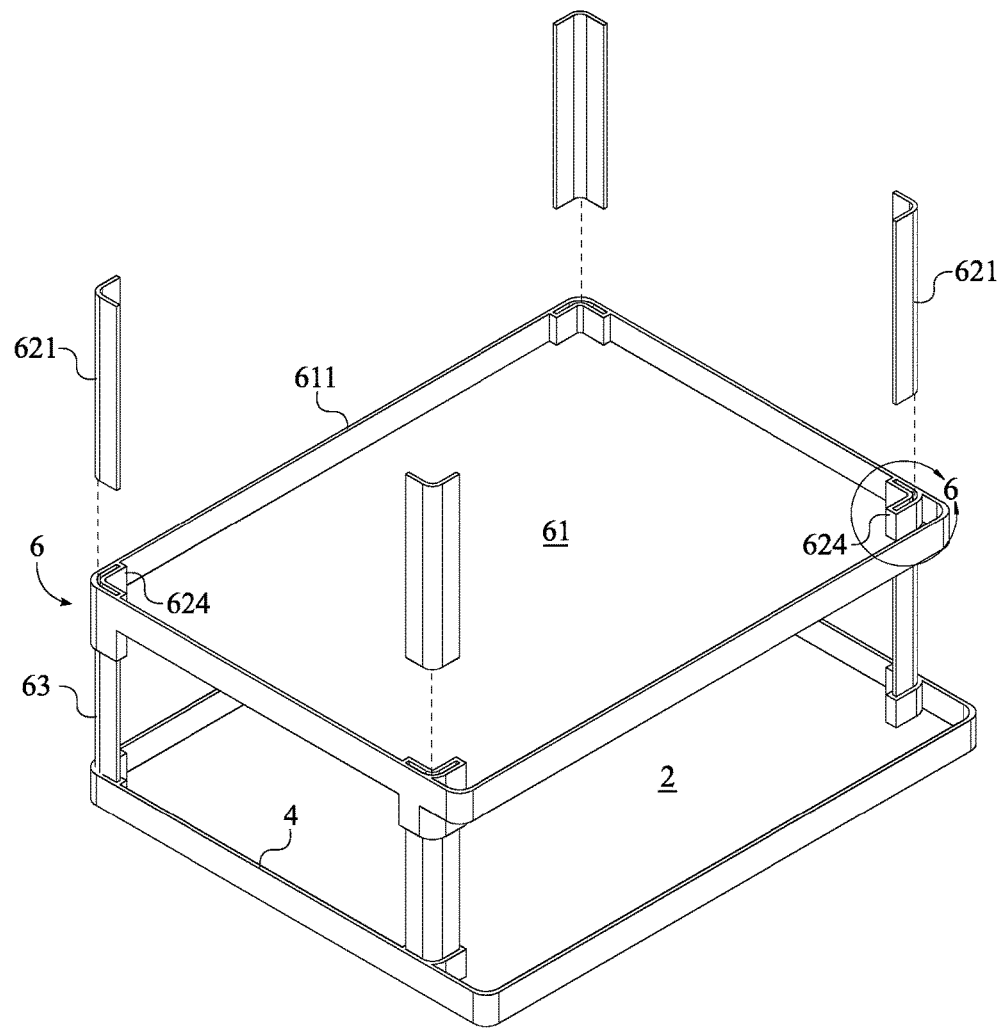
FIG. 5 is top front perspective view of the present invention illustrating the plurality of second receptacles.
Figure 6:
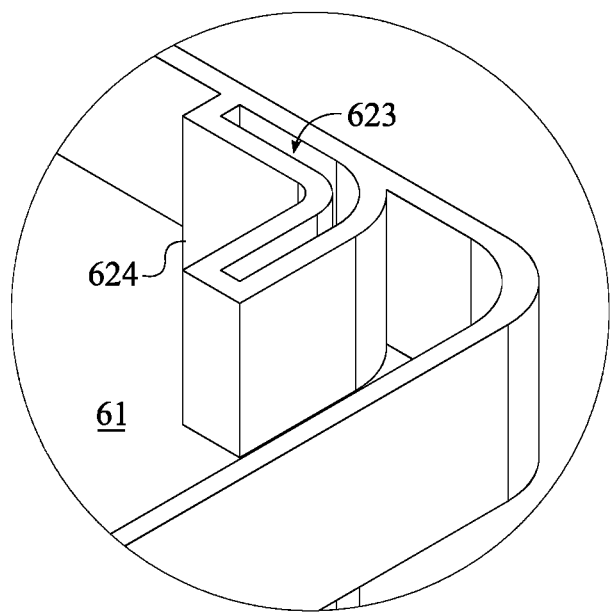
FIG. 6 is detail view of the second receptacles taken about circle 6 in FIG. 5.

Referring to FIG. 5 and FIG. 6, similarly, the plurality of second receptacles 624 is peripherally mounted onto the center shelf 61. To increase structural rigidity, at least two of the plurality of second receptacles 624 are mounted adjacent to the corners of the center shelf 61. Further, an opening 623 of the plurality of second receptacles 624 is oriented towards the top shelf 1. As such, the opening 623 is oriented facing upwards to receive the bottom portion of the corresponding center column.

Referring once more to FIG. 3 and FIG. 5, preferably, each of the plurality of center columns 621 is terminally mounted into a corresponding receptacle from the plurality of first receptacles 622. In the preferred configuration, the weight of the top shelf 1 presses each of the plurality of center columns 621 into the corresponding receptacle from the plurality of first receptacles 622, thereby preventing the plurality of center columns 621 from detaching from the center shelf 61. Further, each of the plurality of center columns 621 is terminally mounted into a corresponding receptacle from the plurality of second receptacles 624. As such, the plurality of center columns 621 is held in place within the plurality of second receptacles 624 by the weight of the top shelf 1 and the barrier support wall 7 pressing down on the plurality of center columns 621.

Figure 9:
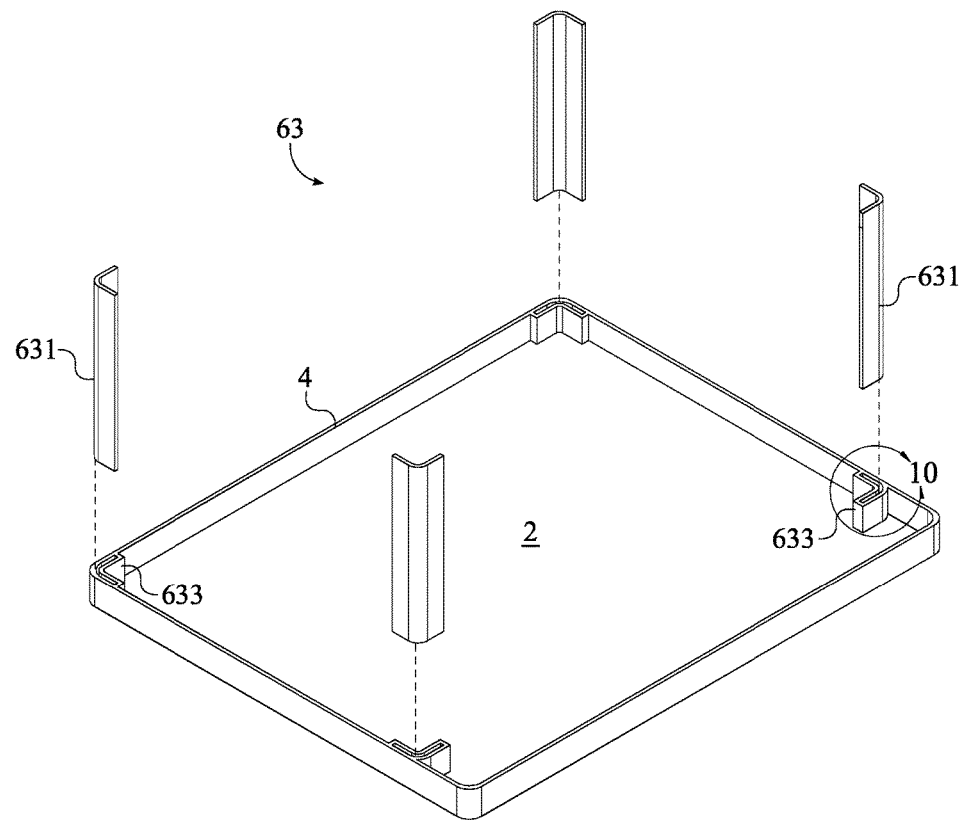
FIG. 9 is top front perspective view of the present invention illustrating the plurality of fourth receptacles.

Referring more specifically to FIG. 5, FIG. 7, and FIG. 9, the lower support frame 63 vertically offsets the center shelf 61 from the bottom shelf 2. The space created between the center shelf 61 and the bottom shelf 2 is used to store grocery bags. Preferably, the lower support frame 63 comprises a plurality of lower columns 631, a plurality of third receptacles 632, and a plurality of fourth receptacles 633. Both the plurality of third receptacles 632 and the plurality of fourth receptacles 633 are L-shaped tubes that form a slip-fit engagement with the plurality of lower columns 631. The plurality of lower columns 631 is an L-shaped column that is 0.25" thick, 2" long, 2" wide, and 10" high. Preferably, the plurality of third receptacles 632 is peripherally mounted onto the center shelf 61. More specifically, each of the plurality of third receptacles 632 is vertically aligned with a corresponding receptacle from the plurality of second receptacles 624. Further, the plurality of third receptacles 632 extrudes normal out of the bottom surface of the center shelf 61.

Referring to FIG. 7 to FIG. 10, an opening 623 of the plurality of third receptacles 632 is oriented towards the bottom shelf 2. Similarly, the plurality of fourth receptacles 633 is peripherally mounted onto the bottom shelf 2. More specifically, the plurality of fourth receptacles 633 is aligned vertically with the plurality of third receptacles 632. An opening 623 of the plurality of fourth receptacles 633 is oriented towards the center shelf 61. This allows the plurality of lower columns 631 to connect between the plurality of third receptacles 632 and the plurality of fourth receptacles 633. More specifically, each of the plurality of lower columns 631 is terminally mounted into a corresponding receptacle from the plurality of third receptacles 632. In the preferred configuration, gravity presses the plurality of lower columns 631 into the plurality of third receptacles 632, thereby preventing the plurality of lower columns 631 from detaching from the center shelf 61.

Figure 10:
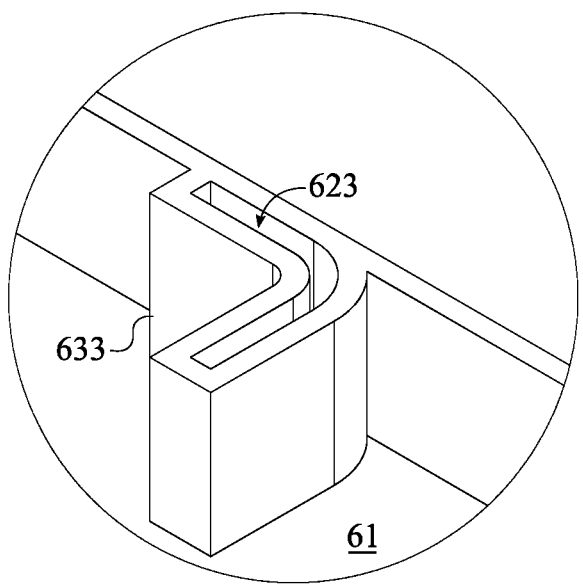
FIG. 10 is detail view of the fourth receptacles taken about circle 9 in FIG. 9.

Referring more specifically to FIG. 9 and FIG. 10, each of the plurality of lower columns 631 is terminally mounted into a corresponding receptacle from the plurality of fourth receptacles 633. The plurality of center columns 621 is held in place within the plurality of fourth receptacles 633 by the weight of the top shelf 1 and the center shelf 61 pressing down on the plurality of lower columns 631. This allows a user to easily disassemble the center support frame 62 for ease of storage. Given the vertical alignment between the plurality of third receptacles 632 and the plurality of fourth receptacles 633, the plurality of lower columns 631 is oriented perpendicular to both the center shelf 61 and the bottom shelf 2. This maximizes the internal volume enclosed by the lower support frame 63.

Figure 11:
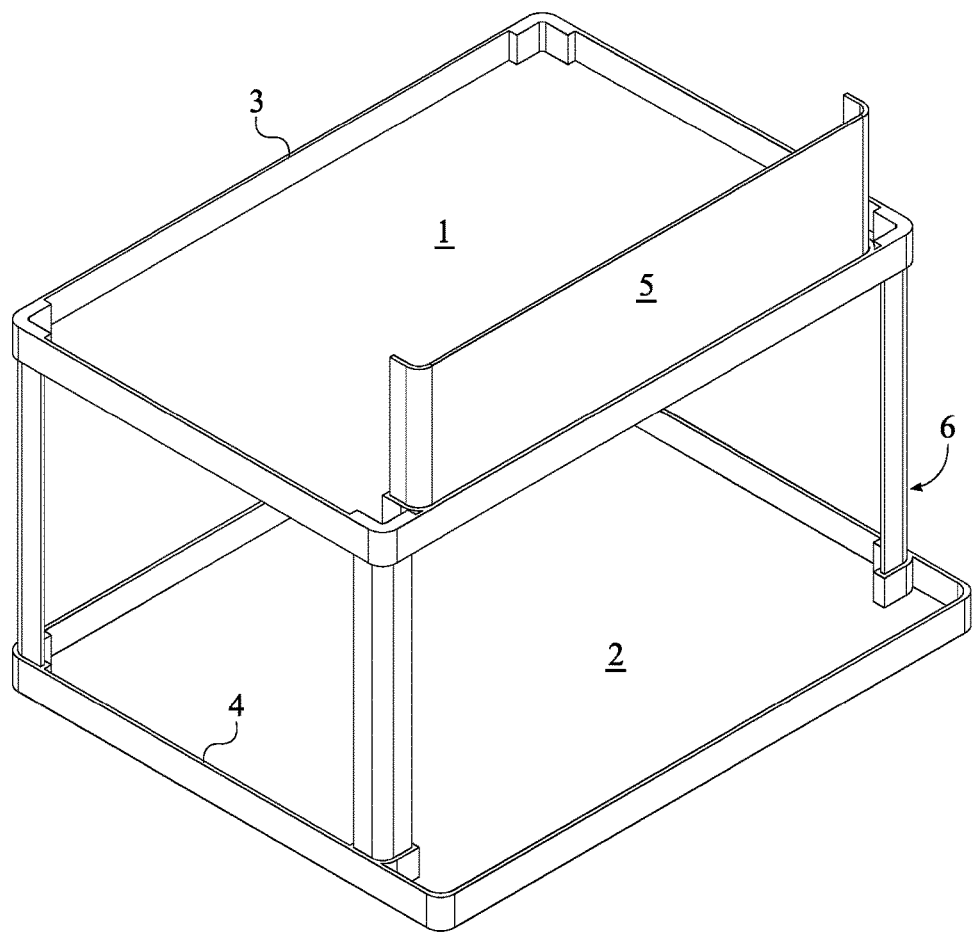
FIG. 11 is top front perspective view of the present invention illustrating the intermediate support frame without the center shelf.

Referring to FIG. 11, in another possible embodiment, the intermediate support frame 6 is used solely to support the top shelf 1 over the bottom shelf 2. As such, the intermediate support frame 6 comprises a center support frame 62. The center support frame 62 is used to create space between the top shelf 1 and the bottom shelf 2 to store grocery bags. Preferably, the top shelf 1 is terminally attached to the center support frame 62. Similarly, the bottom shelf 2 is terminally attached to the center support frame 62, opposite the top shelf 1. The center support frame 62 may be collapsible to allow ease of storage. To disassemble the present invention, the user can simply detach the center support frame 62 from the top shelf 1 and the bottom shelf 2.

Figure 12:
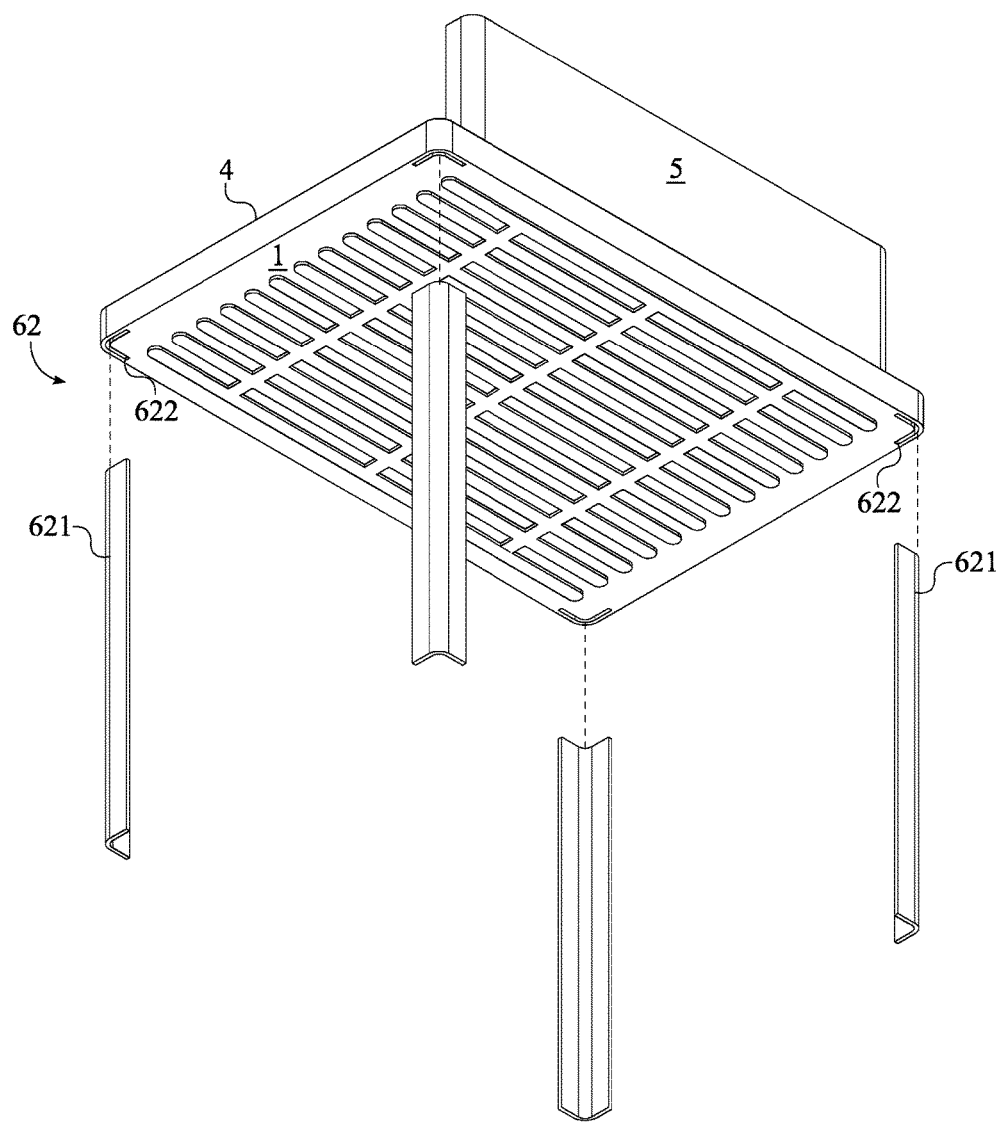
FIG. 12 is bottom front perspective view of the present invention illustrating the plurality of first receptacles.
Figure 13:
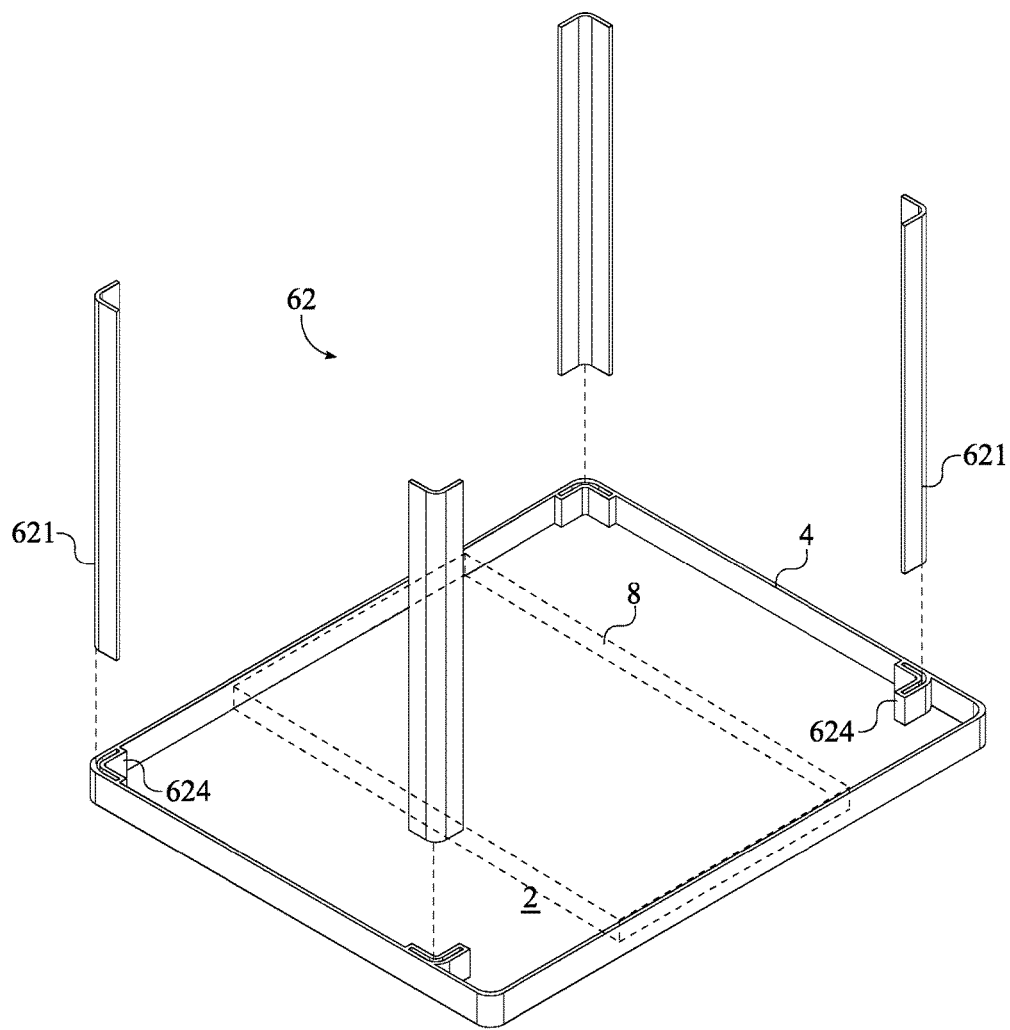
FIG. 13 is top front perspective view of the present invention illustrating the plurality of second receptacles.

Referring to FIG. 12 and FIG. 13, the center support frame 62 comprises a plurality of center columns 621, a plurality of first receptacles 622, and a plurality of second receptacles 624. The plurality of first receptacles 622 is peripherally mounted onto the top shelf 1. Further, an opening 623 of the plurality of first receptacles 622 is oriented towards the bottom shelf 2. More specifically, the plurality of first receptacles 622 is a L-shaped tube that is molded into the bottom surface of the top shelf 1. In the preferred embodiment, each of the plurality of first receptacles 622 is part of the corner of the top shelf. This increases structural rigidity of the top shelf 1. As such, the plurality of center columns 621 inserts into the receptacles 622 of the top shelf 1 through the bottom of the top shelf 1. Similarly, the plurality of second receptacles 624 is peripherally mounted onto the bottom shelf 2. More specifically, each of the plurality of second receptacles 624 is an L-shaped tube. Preferably, at least two of the second receptacles are positioned adjacent to a corner of the bottom shelf 2. This increases the structural rigidity of the bottom shelf 2.

Referring to FIG. 11 and FIG. 13, unlike the plurality of first receptacles 622, the plurality of second receptacles 624 extrude out of the bottom shelf 2. Accordingly, an opening 623 of the plurality of second receptacles 624 is oriented towards the top shelf 1. This allows each of the plurality of second receptacles 624 to connect onto the bottom of a corresponding column from the plurality of center columns 621. Accordingly, each of the plurality of center columns 621 is terminally mounted into a corresponding receptacle from the plurality of first receptacles 622. Preferably, each of the plurality of center columns 621 is 20" in length, thereby allowing a cooler to fit between the top shelf 1 and the bottom shelf 2. Similarly, each of the plurality of center columns 621 is terminally mounted into a corresponding receptacle from the plurality of second receptacles 624. Thus, each of the plurality of second receptacles 624 is vertically aligned to a corresponding receptacle from the plurality of first receptacles 622. To disassemble the intermediate support frame 6, the user can simply lift the top shelf 1 off the plurality of center columns 621 and detach each column from the corresponding receptacle from the plurality of second receptacles 624.

Finally, a cooler-bracing platform 8 permits a cooler to slide on and off the bottom shelf 2. As such, the cooler-bracing platform 8 is connected onto the bottom shelf 2. The cooler-bracing platform 8 is encircled by the bottom lip 4. Further, the height of the cooler-supporting platform 8 is equal to the height of the bottom lip 4. As such, a cooler can be easily moved on and off the cooler-bracing platform 8 without the bottom lip 4 interfering with the cooler's movement.

Although the invention has been explained in relation to its preferred embodiment, it is to be understood that many other possible modifications and variations can be made without departing from the spirit and scope of the invention as hereinafter claimed.

What is claimed is:

1. A trunk mounted storage rack for sports utility vehicles comprises:
    a top shelf;
    a bottom shelf;
    a top lip;
    a bottom lip;
    a top-level barrier;
    an intermediate support frame;
    a barrier support wall;
    the top shelf being terminally attached to the intermediate support frame;
    the bottom shelf being terminally attached to the intermediate support frame, opposite the top shelf;

the top lip being perimetrically connected around the top shelf;
the barrier support wall being connected onto the top shelf;
the top lip and the barrier support wall being oriented away from the intermediate support frame;
the top lip and the barrier support wall being positioned offset from each other;
the top-level barrier being mounted between the top lip and the barrier support wall;
the bottom lip being perimetrically connected around the bottom shelf; and
the bottom lip being oriented towards the intermediate support frame.

2. The trunk mounted storage rack for sports utility vehicles as claimed in claim 1 comprises:
the intermediate support frame comprises a center shelf, a center support frame, and a lower support frame;
the bottom shelf being terminally attached to the lower support frame;
the center shelf being terminally attached to the lower support frame, opposite the bottom shelf;
the center shelf being terminally attached to the center support frame, opposite the lower support frame; and
the top shelf being terminally attached to the center support frame, opposite the center shelf.

3. The trunk mounted storage rack for sports utility vehicles as claimed in claim 2 comprises:
a center lip;
the center lip being perimetrically connected around the center shelf; and
the center lip being oriented away from the bottom shelf.

4. The trunk mounted storage rack for sports utility vehicles as claimed in claim 2 comprises:
the center support frame comprises a plurality of center columns, a plurality of first receptacles, and a plurality of second receptacles;
the plurality of first receptacles being peripherally mounted onto the top shelf;
an opening of the plurality of first receptacles being oriented towards the center shelf;
the plurality of second receptacles being peripherally mounted onto the center shelf;
an opening of the plurality of second receptacles being oriented towards the top shelf;
each of the plurality of center columns being terminally mounted into a corresponding receptacle from the plurality of first receptacles; and
each of the plurality of center columns being terminally mounted into a corresponding receptacle from the plurality of second receptacles.

5. The trunk mounted storage rack for sports utility vehicles as claimed in claim 2 comprises:
the lower support frame comprises a plurality of lower columns, a plurality of third receptacles, and a plurality of fourth receptacles;
the plurality of third receptacles being peripherally mounted onto the center shelf;
an opening of the plurality of third receptacles being oriented towards the bottom shelf;
the plurality of fourth receptacles being peripherally mounted onto the bottom shelf;
an opening of the plurality of fourth receptacles being oriented towards the center shelf;
each of the plurality of lower columns being terminally mounted into a corresponding receptacle from the plurality of third receptacles; and
each of the plurality of lower columns being terminally mounted into a corresponding receptacle from the plurality of fourth receptacles.

6. The trunk mounted storage rack for sports utility vehicles as claimed in claim 1 comprises:
a cooler-bracing platform;
the cooler-bracing platform being connected onto the bottom shelf;
the cooler-bracing platform being encircled by the bottom lip; and
a height of the cooler-bracing platform being equal to a height of the bottom lip.

7. The trunk mounted storage rack for sports utility vehicles as claimed in claim 1 comprises:
the intermediate support frame comprises a center support frame;
the top shelf being terminally attached to the center support frame; and
the bottom shelf being terminally attached to the center support frame, opposite the top shelf.

8. The trunk mounted storage rack for sports utility vehicles as claimed in claim 7 comprises:
the center support frame comprises a plurality of center columns, a plurality of first receptacles, and a plurality of second receptacles;
the plurality of first receptacles being peripherally mounted onto the top shelf;
an opening of the plurality of first receptacles being oriented towards the bottom shelf;
the plurality of second receptacles being peripherally mounted onto the bottom shelf;
an opening of the plurality of second receptacles being oriented towards the top shelf;
each of the plurality of center columns being terminally mounted into a corresponding receptacle from the plurality of first receptacles; and
each of the plurality of center columns being terminally mounted into a corresponding receptacle from the plurality of second receptacles.

9. The trunk mounted storage rack for sports utility vehicles comprises:
a top shelf;
a bottom shelf;
a top lip;
a bottom lip;
a top-level barrier;
an intermediate support frame;
a barrier support wall;
a cooler-bracing platform;
the top shelf being terminally attached to the intermediate support frame;
the bottom shelf being terminally attached to the intermediate support frame, opposite the top shelf;
the top lip being perimetrically connected around the top shelf;
the barrier support wall being connected onto the top shelf;
the top lip and the barrier support wall being oriented away from the intermediate support frame;
the top lip and the barrier support wall being positioned offset from each other;
the top-level barrier being mounted between the top lip and the barrier support wall;
the bottom lip being perimetrically connected around the bottom shelf;
the bottom lip being oriented towards the intermediate support frame;

the cooler-bracing platform being connected onto the bottom shelf;

the cooler-bracing platform being encircled by the bottom lip; and a height of the cooler-bracing platform being equal to a height of the bottom lip.

10. The trunk mounted storage rack for sports utility vehicles as claimed in claim 9 comprises:

the intermediate support frame comprises a center shelf, a center support frame, and a lower support frame;

the bottom shelf being terminally attached to the lower support frame;

the center shelf being terminally attached to the lower support frame, opposite the bottom shelf;

the center shelf being terminally attached to the center support frame, opposite the lower support frame; and the top shelf being terminally attached to the center support frame, opposite the center shelf.

11. The trunk mounted storage rack for sports utility vehicles as claimed in claim 10 comprises:

a center lip;

the center lip being perimetrically connected around the center shelf; and the center lip being oriented away from the bottom shelf.

12. The trunk mounted storage rack for sports utility vehicles as claimed in claim 10 comprises:

the center support frame comprises a plurality of center columns, a plurality of first receptacles, and a plurality of second receptacles;

the plurality of first receptacles being peripherally mounted onto the top shelf;

an opening of the plurality of first receptacles being oriented towards the center shelf;

the plurality of second receptacles being peripherally mounted onto the center shelf;

an opening of the plurality of second receptacles being oriented towards the top shelf;

each of the plurality of center columns being terminally mounted into a corresponding receptacle from the plurality of first receptacles; and each of the plurality of center columns being terminally mounted into a corresponding receptacle from the plurality of second receptacles.

13. The trunk mounted storage rack for sports utility vehicles as claimed in claim 10 comprises:

the lower support frame comprises a plurality of lower columns, a plurality of third receptacles, and a plurality of fourth receptacles;

the plurality of third receptacles being peripherally mounted onto the center shelf;

an opening of the plurality of third receptacles being oriented towards the bottom shelf;

the plurality of fourth receptacles being peripherally mounted onto the bottom shelf;

an opening of the plurality of fourth receptacles being oriented towards the center shelf;

each of the plurality of lower columns being terminally mounted into a corresponding receptacle from the plurality of third receptacles; and each of the plurality of lower columns being terminally mounted into a corresponding receptacle from the plurality of fourth receptacles.

14. The trunk mounted storage rack for sports utility vehicles as claimed in claim 9 comprises:

the intermediate support frame comprises a center support frame;

the top shelf being terminally attached to the center support frame; and the bottom shelf being terminally attached to the center support frame, opposite the top shelf.

15. The trunk mounted storage rack for sports utility vehicles as claimed in claim 14 comprises:

the center support frame comprises a plurality of center columns, a plurality of first receptacles, and a plurality of second receptacles;

the plurality of first receptacles being peripherally mounted onto the top shelf;

an opening of the plurality of first receptacles being oriented towards the bottom shelf;

the plurality of second receptacles being peripherally mounted onto the bottom shelf;

an opening of the plurality of second receptacles being oriented towards the top shelf;

each of the plurality of center columns being terminally mounted into a corresponding receptacle from the plurality of first receptacles; and each of the plurality of center columns being terminally mounted into a corresponding receptacle from the plurality of second receptacles.

\* \* \* \* \*